Figure 3:
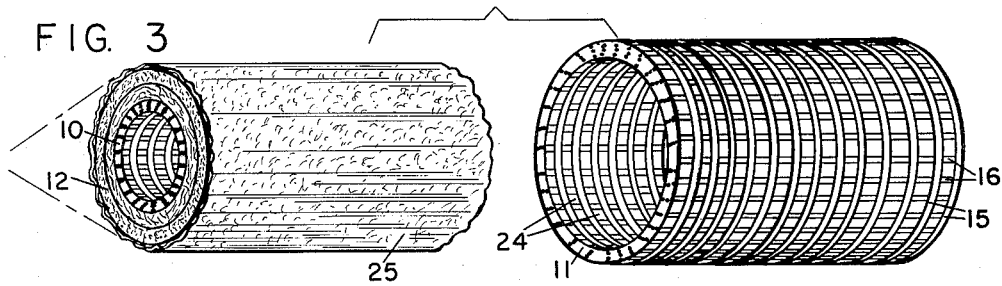

March 27, 1962 R. C. BRYAN 3,026,609
FILTER METHOD
Filed Oct. 8, 1959 2 Sheets-Sheet 1
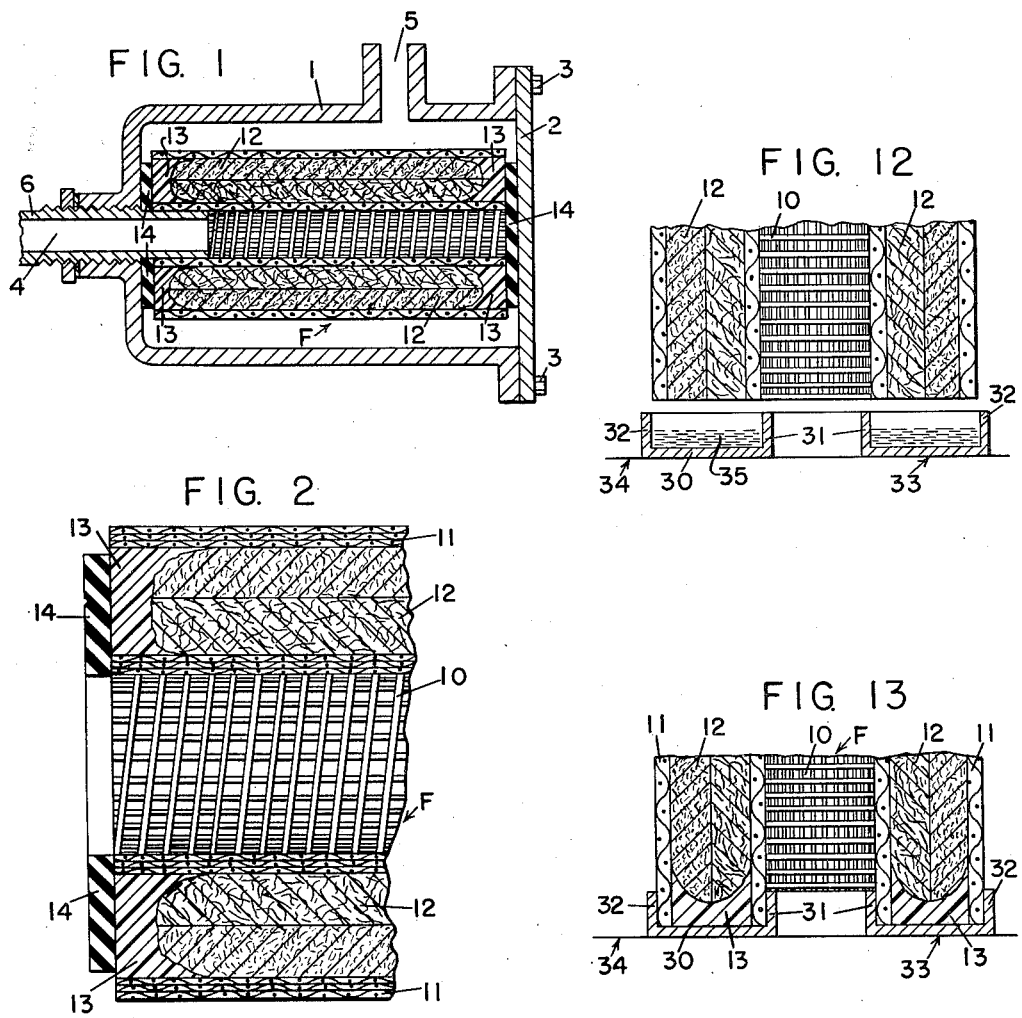
INVENTOR
RICHARD C. BRYAN
Charles T. Hawley
ATTORNEY March 27, 1962  R. C. BRYAN  3,026,609
FILTER METHOD
Filed Oct. 8, 1959  2 Sheets-Sheet 2

INVENTOR
RICHARD C. BRYAN
Charles T. Hawley
ATTORNEY

United States Patent Office 3,026,609
Patented Mar. 27, 1962

3,026,609
FILTER METHOD
Richard C. Bryan, Fairhaven, Mass., assignor to Carl N. Beetle Plastics Corporation, Fall River, Mass., a corporation of Massachusetts
Filed Oct. 8, 1959, Ser. No. 845,111
4 Claims. (Cl. 29—419)

This invention relates to filter cartridges and their method of manufacture.

Liquid fuel for jet engines may be drawn from a tank containing rust, marine life and other contaminants, and such fuel must be filtered before it can be used in an engine. In the past filters for this purpose have been made with inner and outer perforated sheet metal cylinders or tubes between which is located the filter material. The ends of the tubes are joined by sheet metal rings or end plates which help to hold the material in place. It is difficult, however, to effect a satisfactory attachment between the metal tubes and the metal end plates, with the result that unfiltered fuel can by-pass the cartridge. Furthermore, such cartridges have considerable weight and must be made of expensive metal to withstand corrosion. Also, in such cartridges it is difficult to effect much variation in design and in the filter material between the tubes.

It is an important object of the invention to provide a filter cartridge which avoids the above noted faults by using lightweight porous tubes and lightweight sealing means closing the ends of the tubes in a manner that prevents leakage of unfiltered fuel.

It is a further object of the invention to make the filter tubes of open mesh fabric wrapped in cylindrical form and having the wraps fastened together by a plastic binder material, such as a polyester resin.

It is another object of the invention to provide an improved filter cartridge having inner and outer cylinders made of wraps of open mesh fabric bonded with a plastic binding agent in such manner as to leave multiple openings through the cylinders for the passage of liquid fuel therethrough. Filter material is held under compression between the cylinders and the liquid being filtered passes through the openings of one of the cylinders into the cartridge through the filter material and then out of the openings in the other cylinder.

It is a further object of the invention to provide an improved method for making a filter cartridge including the steps of exerting a radial compressing force in an inward direction on inherently resilient filter material, such as Fiberglas, inserting it into the outer tube of the cartridge while under the compressing force, and then releasing the compressing force to enable the filter material to expand against the outer tube. As set forth hereinafter the compressing force is exerted by vacuum pressure.

Figure 4:
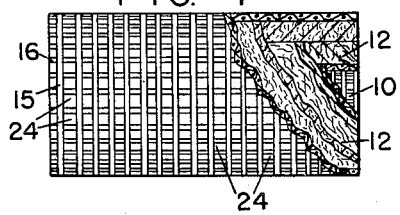
Figure 5:
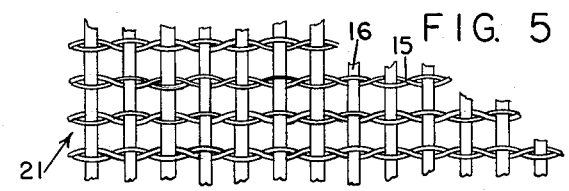
Figure 9:
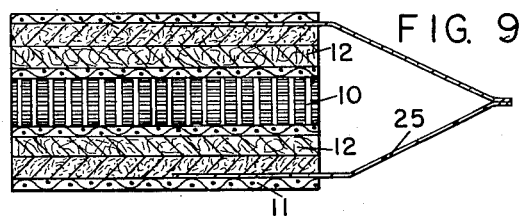
Figure 7:
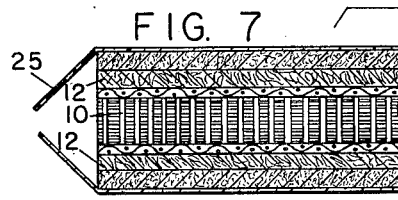
Figure 11:
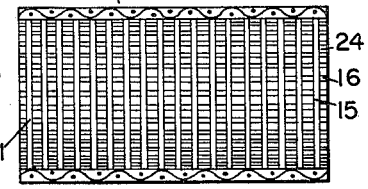
Figure 8:
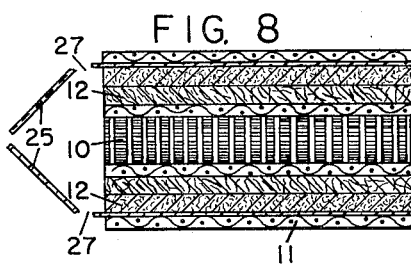
Figure 10:
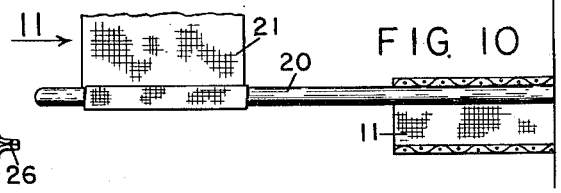

In the accompanying drawings which by way of example show a form of the improved filter cartridge and a method of making it, FIG. 1 is a vertical section through a mounting for the filter cartridge, FIG. 2 is an enlarged sectional view of the left-hand end of the cartridge shown in FIG. 1, FIG. 3 shows the inner tube and filter material surrounded by a vacuum bag at the left preparatory to inserting into the outer tube at the right, FIG. 4 is an elevation, parts broken away, of the parts after insertion of the filter material into the outer cylinder and removal of the vacuum bag, but before the sealing plugs shown in FIG. 2 are added, FIG. 5 shows part of the fabric used in making the inner and outer tubes, FIGS. 6 to 9 are diagrammatic views showing the steps in the method of making the cartridge, FIG. 10 is an elevation of support means such as can be used in carrying out the method, FIG. 11 is a diagrammatic view showing how the wraps of the open mesh fabric are sealed together to form a tube, and FIGS. 12 and 13 illustrate a method of applying the end plugs to the cartridge.

FIG. 1 shows a casing 1 which may be suitably mounted, for instance, on an aircraft carrier. The casing has a cover 2 which may be removed and replaced by means of screws 3, has an inlet end 4 for the liquid fuel to be filtered and has an outlet end 5 for the filtered fuel. A supply pipe 6 is shown as a means by which fuel from a tank can be delivered to the interior of the filter F and suitable means may be attached to the outlet 5 to convey the filtered fuel to the engine or other equipment which is to use it. FIG. 1 shows only one example of the various ways in which the cartridge can be used.

The filter itself as shown in FIG. 2 comprises an inner porous tube 10, made partly at least of Fiberglas, an outer larger porous tube or shell 11 preferably concentric with but otherwise similar to the inner tube, filter material 12 between the tubes, a molded plug 13 at each end, and a gasket 14 at each end cemented to the plug 13. The tubes are made of open mesh leno fabric such as shown in FIG. 5 having crossed or leno warp threads 15 and weft threads 16. The warp and weft threads preferably contain some glass fibers, or can be made entirely of Fiberglas. It should be noted, however, that any open mesh woven cloth can be used.

Both of the tubes are made more or less in the same manner, FIG. 11 indicating how the inner tube can be made by means of a mandrel 20. The mandrel is first covered with a lubricant such as Vaseline over which is placed a thin layer of flexible material such as cellophane and then the sheet open mesh material 21, preferably woven, is wrapped around the cellophane as suggested in FIG. 11. A fluid catalyzed polyester resin 22 is poured from a source 23 along the area of contact between the previously formed wrap and the material 21 which approaches the mandrel. It is found that three wraps of the material form a sufficiently strong tube to withstand the pressures used in pumping the liquid fuel. The outer tube can be made in a similar manner and the mesh of the fabric 21 is such that even with three wraps there are still many openings or spaces 24 in both tubes through which liquid fuel can pass. The polyester used will cure at room temperature as soon as its solvent evaporates, but if desired a noncatalyzed polyester resin can be applied to the fabric before the wrapping and the curing then effected by heat. In one instance the walls of the tubes were about 1/16" thick, but this dimension may be varied.

After the inner tube has been formed the filter material 12 is wrapped on it snugly but uncompressed. There may be varying grades of filter material used in the cartridge but in one form of cartridge which has been developed two grades of inherently resilient Fiberglas filter material have been employed, a relatively coarse material being wrapped close to the tube 10 and a relatively fine Fiberglas material being wrapped over the coarser material. The wrapping is continued until a normal uncompressed given external diameter of the filter material is attained, this diameter being greater than the internal diameter of the outer tube 11.

Figure 6:
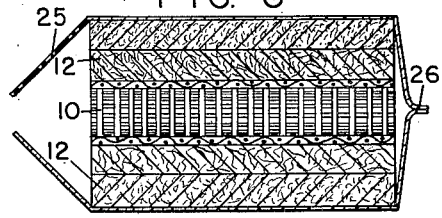

A collapsible flexible envelope or bag 25 is then slipped over the filter material and its right-hand end as shown in FIG. 6 being sealed as at 26 to form a closed-end bag. The left-hand end of the bag then has a vacuum pump (not shown) connected to it to withdraw air from the bag to reduce the air pressure therein and cause atmospheric pressure to exert a compressive force externally to the bag with the filter material therein to shrink the latter to a diameter slightly less than the interior diameter of the outer tube 11. The filter material and bag are then in the form shown at the left of FIG. 7 and can be moved to the right and be inserted into the tube 11 to form the assembly suggested in FIG. 8. The left end of the bag is then cut as at 27 close to the outer tube to remove the compressive force and the right-hand end of the bag then drawn out as indicated in FIG. 9. As soon as the bag is cut at 27 the partial vacuum disappears and the inherently resilient filter material expands to fill the space between the two tubes. Cutting the bag at 27 is not the only way in which the vacuum force can be reduced, but has been found to be convenient since it leaves a minimum length of bag to be withdrawn.

In the practice of the invention the bag has been made of sheet Mylar cut to the proper width and length and having overlapping edges sealed to each other and having the right-hand end sealed, as already mentioned. After the bag has been removed the tubes and the filter material will be as shown in FIG. 4. Any other type of bag can be used so long as it can be collapsed and exert a compressing force on the filter material.

The next step in the manufacture of the cartridge is to put the assembly as shown in FIG. 4 into a mold and form the plug 13 on each end. These plugs are preferably made of a polyester resin which unites with the polyester resin which binds the various wraps of the two tubes. The gaskets 14 are cemented in place after the plugs have been completed. The gaskets have been made of elastic rubber to permit a close sealing of the cartridge in the casing 1. At least one of the gaskets has a hole for entry of the pipe 6. At the other end both the plug and gasket can, if desired, be solid across the cartridge.

A method of applying the plugs 13 is illustrated in FIGS. 12 and 13. A mold 30 has inner and outer vertical cylindrical walls 31 and 32 respectively, joined at their lower ends by a bottom of floor 33. The mold is mounted on a support 34 and a thermosetting fluid catalyzed resin or plastic 35, such as polyester, is poured to a predetermined depth into the mold. The structure shown in FIG. 4 is then moved down from the position shown in FIG. 12 until the tubes are deeply seated into the mold as shown in FIG. 13. When the resin sets the partly finished cartridge is removed upwardly from the mold and the operation repeated for its other end. During setting of the resin, the latter becomes saturated and impregnated with the fibers of the end portions of the filter material to form a solid mass of nonfilter material entirely within the cartridge and extending from one tube to the other through the filter.

While a particular material has been mentioned for making the bag, the invention is not necessarily limited to this material and any other flexible collapsible material which can withstand a reasonably high vacuum can be used.

From the foregoing it will be seen that the invention sets forth a filter cartridge containing no metal and made preferably of plastic material which does not corrode or dissolve in the liquid fuel being filtered. The particular palstic mentioned hereinbefore is a polyester resin but the invention is not necessarily limited to this material since an epoxy or similar material can be used. It will also be seen that the plugs 13 are made of the same material as that which binds the wraps of fabric of which the inner and outer tubes are made so that tight joint can be established with the tubes effective to prevent leakage of unfiltered fuel. The method of compressing the oversized filter material when in its normal condition employs a radially acting force, such as a vacuum, which acts to reduce the outside diameter of the filter so that it can be fitted into the larger tube. Release of the vacuum accomplishes expansion of the filter material due to its inherent resilience and removal of the bag from between the outer tube and the filter material allows the latter, due to its resilience, to fill the space between the tubes. While Mylar has been mentioned as a suitable material for making the vacuum bag, the invention is not limited to the use of this material.

I claim:

1. The method of making a liquid filter including the following steps: providing a porous inner tube having openings therein to permit liquid fuel to pass from within the tube through the latter, wrapping filter material directly around said tube to a normal, uncompressed given external diameter, providing a porous outer tube having openings therein to permit passage of liquid fuel outwardly from within said outer tube, the latter having an internal diameter less than said given diameter, slipping the inner tube and wrapped material thereon into a closed-end flexible bag containing air at normal atmospheric pressure, reducing the pressure within the bag, applying atmospheric pressure externally to the bag with the filter material therein to subject the bag and filter material to a radial compressive force inwardly effective to reduce the diameters thereof to a size less than the internal diameter of said outer tube, inserting the compressed flexible bag and the inner tube and compressed filter material into said outer tube, and removing said compressive force, whereupon the filter material undergoes expansion and fills said outer tube.

2. The method set forth in claim 1 wherein the tubes include a thermosetting plastic in their construction, the additional step of molding plugs of thermosetting plastic material integrated with said filter material to the ends of the tubes to close the spaces between them at the ends of the filter.

3. The method set forth in claim 1 wherein the compressive force is applied by surrounding the filter material when having its normal given diameter by a film of flexible collapsible material and then creating a partial vacuum in said film effective to produce said compressive force to reduce said given diameter to a lesser diameter, and relieving the vacuum after the filter material thus compressed has been inserted into said outer tube.

4. The method of making a lightweight liquid filter cartridge including the following steps: wrapping inherently resilient Fiberglas filter material around a porous tube to a normal uncompressed given diameter, enclosing the tube and material thereon in a collapsible bag, atmospherically compressing said bag by evacuating air from the bag to reduce the size of the wrapping to a compressed diameter less than said given diameter, fitting the tube and compressed filter material and bag into a cylindrical porous shell the internal diameter of which is intermediate between said given and said compressed diameters, admitting atmospheric pressures into said bag to enable the filter material to expand and fill said shell, and removing said bag from around the filter material.

References Cited in the file of this patent

UNITED STATES PATENTS

| 2,732,031 | Rabbitt | Jan. 24, 1956 |
| 2,739,713 | Robinson | Mar. 27, 1956 |
| 2,764,859 | Hauselmann | Oct. 2, 1956 |
| 2,781,619 | Gardes | Feb. 19, 1957 |
| 2,911,101 | Robinson | Nov. 3, 1959 |